United States Patent
Eckert et al.

(10) Patent No.: US 6,473,681 B1
(45) Date of Patent: Oct. 29, 2002

(54) METHOD FOR REDUCING BRAKING DISTANCE

(75) Inventors: Alfred Eckert, Mainz; Thomas Berthold, Darmstadt, both of (DE); Erwin Tieleman, Axel (NL)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/673,588

(22) PCT Filed: Apr. 7, 1999

(86) PCT No.: PCT/EP99/02354
§ 371 (c)(1),
(2), (4) Date: Jan. 12, 2001

(87) PCT Pub. No.: WO99/54179
PCT Pub. Date: Oct. 28, 1999

(30) Foreign Application Priority Data

Apr. 18, 1998 (DE) .......................................... 198 17 326

(51) Int. Cl.$^7$ ................................................ B60T 8/32
(52) U.S. Cl. ............................ 701/70; 701/78; 701/96; 701/301; 180/175
(58) Field of Search ............................. 701/70, 76, 78, 701/96, 301; 303/155; 180/175, 176, 177

(56) References Cited

U.S. PATENT DOCUMENTS 5,158,343 A * 10/1992 Reichelt et al. ............. 188/353

(List continued on next page.)

FOREIGN PATENT DOCUMENTS

| DE | 41 01 759 | 8/1991 |
|---|---|---|
| DE | 40 28 290 | 1/1992 |
| DE | 42 13 148 | 11/1992 |

(List continued on next page.)

OTHER PUBLICATIONS

Kiesewetter, et al.: "Der neue Brake Assist von Mercedes–Benz"; ATZ, vol. 99, Ed. 6, p. 330–333, 336–339 (1997).

Pikenhahn: "EAS der Stufe 3"; ATZ, vol. 97, Ed. 1, p. 36–37 (1995).

*Primary Examiner*—Michael J. Zanelli
*Assistant Examiner*—Eric M Gibson
(74) *Attorney, Agent, or Firm*—Rader, Fishman & Grauer PLL

(57) ABSTRACT

The invention concerns a process for shortening the braking distance of a vehicle equipped with a brake servo unit which during a standard braking action is only triggered by the brake pedal pressure caused by the driver and in case of a critical driving situation is so triggered by a control device that in comparison to the standard braking action an increased amplification factor is set at the brake servo unit. The invention distinguishes itself by the fact that a danger potential is determined, stating the probability that the vehicle to be braked will be involved in an accident and that the increase of the amplification factor is controlled in accordance with the danger potential.

20 Claims, 6 Drawing Sheets

U.S. PATENT DOCUMENTS

| | | | | |
|---|---|---|---|---|
| 5,535,123 | A | * 7/1996 | Rump et al. | 303/155 |
| 5,564,797 | A | * 10/1996 | Steiner et al. | 303/113.4 |
| 5,607,209 | A | * 3/1997 | Narita et al. | 303/122.11 |
| 5,719,769 | A | * 2/1998 | Brugger et al. | 303/113.4 |
| 5,727,854 | A | * 3/1998 | Pueschel et al. | 188/DIG. 1 |
| 5,748,477 | A | * 5/1998 | Katoh | 280/735 |
| 5,835,008 | A | * 11/1998 | Colemere, Jr. | 340/439 |
| 6,131,063 | A | * 10/2000 | Seki et al. | 340/575 |
| 6,212,459 | B1 | * 4/2001 | Unterforsthuber | 701/70 |
| 6,292,753 | B1 | * 9/2001 | Sugimoto et al. | 340/435 |

FOREIGN PATENT DOCUMENTS

| | | |
|---|---|---|
| DE | 41 40 327 | 6/1993 |
| DE | 42 08 496 | 8/1993 |
| DE | 43 02 541 | 8/1993 |
| DE | 43 10 354 | 10/1993 |
| DE | 43 38 244 | 5/1994 |
| DE | 43 05 186 | 9/1994 |
| DE | 43 09 850 | 9/1994 |
| DE | 44 07 757 | 9/1994 |
| DE | 44 13 172 | 3/1995 |
| DE | 44 18 270 | 11/1995 |
| DE | 44 37 365 | 5/1996 |
| DE | 195 07 433 | 6/1996 |
| DE | 195 03 622 | 8/1996 |
| DE | 196 05 813 | 8/1996 |
| DE | 195 11 844 | 10/1996 |
| DE | 195 24 939 | 1/1997 |
| DE | 195 26 659 | 1/1997 |
| DE | 196 07 048 | 8/1997 |
| DE | 196 08 616 | 9/1997 |
| DE | 297 09 110 | 9/1997 |
| EP | 0 616 932 | 9/1994 |
| JP | 09 142203 | 6/1997 |

* cited by examiner

METHOD FOR REDUCING BRAKING DISTANCE

TECHNICAL FIELD

The invention generally relates to brake systems and more particularly relates to a process for shortening the braking distance of a vehicle.

BACKGROUND OF THE INVENTION

A process for shortening the braking distance is well-known from DE 89 11 963 U1 where on the basis of two present signals a pre-braking action is started for a duration of approx. 0.5 s. At the same time the first signal is triggered by the driver activating a switch. This switch is so arranged that it is either operated by the left foot or one hand and in case of the manual operation the switch is preferably so arranged that the hand does not have to be removed from the steering wheel. The second signal is triggered by recording the speed the driver uses to remove his foot from the accelerator. If this speed is above a certain threshold value pre-braking is automatically started.

In case of this well-known process it is disadvantageous that the driver must carry out a control function that is unusual when driving a vehicle, meaning he/she has to operate a switch with the left foot and one hand, respectively.

Therefore a process is proposed in the genus forming DE 40 28 290 C1 where a larger brake pressure is automatically created than the one resulting from the position of the brake pedal when the speed the brake pedal is operated with exceeds a predetermined value. This is the only criterion for triggering the automatic braking action. In comparison to the process well-known from DE 89 11 963 U1 this process is advantageous since the driver of a vehicle equipped with a so-called brake assistant triggering an automatic brake action does not have to specifically adjust his/her behavior to it, but is able to operate the individual operational controls, in particular the brake pedal, in the usual way.

Nevertheless, a panic situation is recognized and a brake action carried out that correspondingly decelerates faster.

This process has proved its worth in panic situations since the braking distance can be shortened and an accident avoided.

In this process a maximum brake pressure is created by the brake servo unit after the automatic brake action has been triggered in order to shorten the braking distance to the maximum. The automatic brake action is ended when the brake pressure applied to the brake pedal decreases. Since the brake servo unit is automatically activated, the brake pedal pressure is able to reduce itself automatically since the pedal resistance decreases. As a result an unintentional deactivation of the automatic brake action may be caused. Therefore the automatic brake action can be ended without the driver of the vehicle wanting or intending it.

On the other hand the automatic brake action may be triggered unintentionally by a driver reacting quickly to a change in the driving situation causing a maximum of the vehicle's deceleration without this being necessary or desired. In certain driving situations such a surprising, unintentionally strong braking may result in an disturbance of the traffic flow, particularly in case of dense lines of traffic, or it may even case an accident with a following vehicle.

Although it is simple for the driver of a corresponding vehicle to opoperate this well-known process for shortening the braking distance in his usual way, it may, however, in certain situations result in an unintentionally too low or too high a deceleration of the vehicle. Thus the driver does not always have the complete control of his/her vehicle.

Brake servo units suitable for such processes to shorten the braking distance that can be controlled either mechanically by means of an control bar or electrically by means of a solenoid are well-known from DE 43 24 205 A1 and DE 195 48 705 A1.

The invention is based upon the task to create a process for shortening the braking distance for which the driver of a vehicle does not have to change his behavior, yet is carrying out a suitable deceleration of the vehicle in all driving situations and which enables the driver to maintain safe control of his/her vehicle even during a braking action decelerating more strongly.

According to the process in accordance with the present invention a danger potential is determined showing the probability that the vehicle to be braked will be involved in an accident. In accordance with the danger potential the amplification factor of the brake servo unit is increased in a dangerous situation.

Thus the process in accordance with the invention distinguishes itself from the one well-known out of DE 40 28 290 C1 essentially by the fact that during an automatic brake action there is no need for a maximum deceleration but that the deceleration may take on variable values that are lower for a lower danger potential than for a higher one. This triggers a brake action adjusted to the driving situation that can be considerably better controlled by the driver than a very sudden start of a maximum deceleration.

The inventors of the present invention call a device controlling a process in accordance with the invention a so-called "analogous brake assistant". This should give expression to the fact that the process in accordance with the invention as a rule brakes with continuously adjustable, variable deceleration values whilst the process known from DE 40 28 290 C1 only switches over "digitally" between a mechanically controlled braking and an automatic full brake application.

DETAILED DESCRIPTION OF THE PREFERRED EMBODIMENTS

Figure 1:
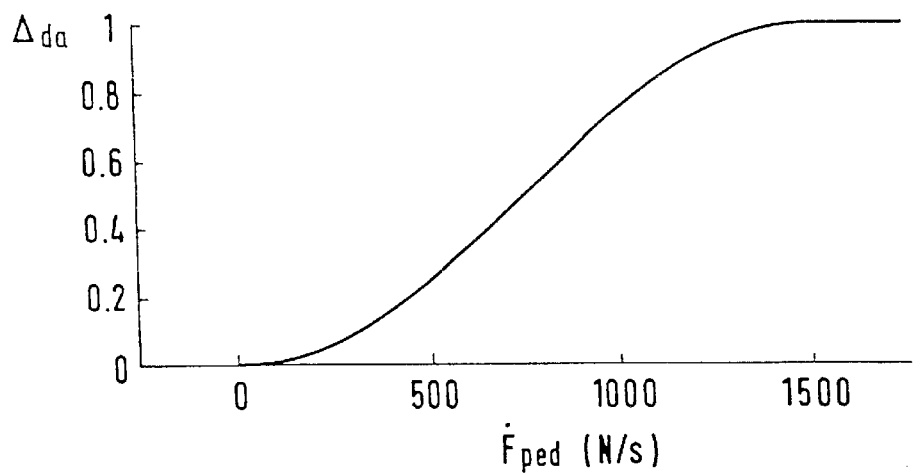
FIG. 1 the function for the calculation of a drivers danger potential $\Delta_{da}$.

The process in accordance with the invention for shortening the braking distance triggers a brake servo unit as it is well-known, for example, from DE 195 48 705 A1. This brake servo unit can be directly and mechanically controlled at a control bar; then the brake pedal pressure $F_{ped}$ put on the brake pedal is transferred to the control bar. In addition, this brake servo unit can also be electrically controlled by a solenoid in order to increase the brake pressure put, for example, on the individual brake elements in danger situations.

In order to trigger the brake sensor unit electrically an electronic control device is provided that is connected to various sensors in order to carry out the process in accordance with the invention for shortening the braking distance of a vehicle.

Under normal driving conditions the process for shortening the braking distance works in a manner well-known as such; then the brake servo unit is triggered only mechanically by operating the control bar by means of the brake pedal. In critical driving situations the brake servo unit is triggered in such a way that, in comparison to an amplification factor $\Lambda_0$ available during a purely mechanical operation of the brake servo unit an increased amplification factor $\Lambda$ is set at the brake servo unit by an electrical activation of the brake servo unit. For this purpose a danger potential $\Delta$ is determined in accordance with the invention corresponding to the accident risk the vehicle to be braked is in.

Such an accident risk is not a physical variable and therefore it cannot be directly measured. In the mathematical meaning the danger potential $\Delta$ is rather a probability and therefore takes on values between 0 (no accident risk) and 1 (acute accident risk, emergency situation). It goes without saying that the danger potential $\Delta$ can also be scaled in a different range of numbers, for example from 0 to 100. The following description is based on a range of numbers from 0 to 1 for the danger potential $\Delta$. It is essential for the invention that the danger potential is able to take on several variables and does not only distinguish between two situations such as the existence of an accident risk and the non-existence of an accident risk.

The danger potential is estimated from available physical variables essentially based upon the confirmation of the brake signal by the driver and the prevailing danger situation the vehicle to be braked is in and from statistical figures drawn from past experience such as the mean reaction time.

A distinction is made between the driver danger potential $\Delta_{da}$—based on the data determined whilst the brake is activated—and the driving situation danger potential $\Lambda_{ds}$—based on the data determined out of the driving situation.

A driver recognizing a danger situation activates the individual control elements of the vehicle in order to avoid an accident in a characteristic way. He/she will, for example, very quickly take his/her right foot off the accelerator and activate the brake pedal. In addition, fast steering movements are possible that do not normally occur. Therefore the following physical variables can be used in order to determine the driver danger potential $\Delta_{da}$:

the speed used to remove the foot from the accelerator,
the pedal changing time the driver needs to move from the accelerator to the brake pedal,
the brake pedal travel,
the brake pedal speed,
the brake pedal force $F_{ped}$,
the change in the brake pedal force $F_{ped}$ and/or
the change in the steering angle.

On the basis of these measurable parameters the danger potential $\Delta_{da}$ can be estimated; at the same time the estimate may be based on a single one of these parameters or on a combination of several parameters. The above parameters are not an exhaustive listing, on the contrary similar ascertainable parameters may also be used to determine the danger potential, such as the force applied to the control bar of the brake servo unit that is proportional to the brake pedal force $F_{ped}$ or the travel $s_{mem}$ of a diaphragm provided within the brake servo unit and their differentiations in time that correspond to the travel of the accelerator and its change, respectively, etc.

When using the brake pedal travel or any variable corresponding to it in order to determine the danger potential, it shall be taken into consideration that with the start of the electrical control of the brake servo unit the control bar of the brake servo unit and with it the pedal are automatically activated and therefore the brake pedal travel alone may no longer serve for an objectively valid estimate. In addition, it has been proved that the brake pedal is often activated with high speed but only for a short time and with low force. In such a case the high pedal speed is no valid indicator for a danger potential. When the pedal speed is used as an indicator for the danger potential, it is preferably combined with another parameter, such as the brake pedal force or the brake pedal travel. Since it is expensive to employ sensors for the direct measurement of brake pedal travel, it is therefore expedient to use the shifting of a diaphragm $s_{mem}$ in the brake servo unit corresponding to the brake pedal travel as the indicator for the danger potential. As a result the output $$P = F_{ped} \cdot \dot{s}_{mem}$$

can be used as an easily measurable variable realistically estimating the danger potential.

Other parameters for determining the driver danger potential $\Delta_{da}$ may be, for example $$s_{mem} \cdot \dot{s}_{mem}, \dot{F}_{ped} \cdot s_{mem}, \dot{F}_{ped} \cdot F_{ped} \text{ or } \dot{F}_{ped} \cdot \dot{s}_{mem}.$$

Additionally or alternatively the steering angle and the accelerator travel and their differentiations in time may be used.

It is also possible to use a combination of parameters with $$\Delta_{da} = \sum_{i=1}^{n} |Parameter_i| \cdot g_i$$

with $g_i$ representing a weighting factor for the respective parameter $_i$.

In addition, a fault identification may be carried out by a comparison of the pedal force with the pedal travel or diaphragm travel or the pressure built up in the brake servo unit or by comparing the diaphragm travel with the pressure built up in the brake servo unit. Therefore a sensor configuration with a pressure sensor and a force sensor is preferred for the process in accordance with the invention because it creates a solution with fault identification at a reasonable price.

In lieu of the control actions carried out by the driver the physical conditions of the driver, such as his/her heart rhythm, eye movements, etc. may on principle also be used to determine a danger situation. If these parameters are ascertainable with sensors working without contact, they may obtain a practical significance.

An embodiment example for determining the driver danger potential $\Delta_{da}$ is described below; at the same time the driver danger potential $\Delta_{da}$ is determined out of the change in the brake pedal force $F_{ped}$. It has actually been proved that in normal driving situations changes in the brake pedal force of up to 200 N/s are practiced by the driver, whilst in danger situations the changes in the brake pedal force may reach 1500 N/s or more. These values depend very much on the driver; in danger situations some drivers may even practice changes in the brake pedal force of up to 8000 N/s. Since it is more likely that the people with a lower change in the brake pedal force do not brake sufficiently strongly, it is expedient to equate the driver danger potential $\Delta_{da}$ for a change in the brake pedal force of 1500 N/s with 1 ($\Delta_{da}=1$). For a negative change in the brake pedal force the driver danger potential $\Delta_{da}$ is equated with 0. Between the values 0 to 1500 N/s the driver danger potential $\Delta_{da}$ increases from 0 to 1. For this transition a cosine function is preferably selected because it shows continuous transitions in the range of a change in the brake pedal force $F_{ped}=0$ N/s and at $F_{ped}=1500$ N/s. Therefore the following formula applies to $\Delta_{da}$:

$$\Delta_{da} = \frac{1}{2} \cdot \left\{ 1 - \cos\left( \pi \cdot \min\left( \max\left( \frac{\dot{F}_{ped}}{1500}, 0 \right), 1 \right) \right) \right\}$$

The development of this function is shown in FIG. 1.

Figure 2:
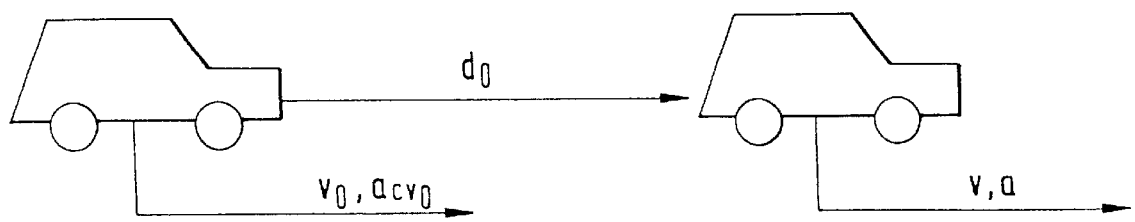
FIG. 2 two vehicles following each other as an illustration of the relevant physical variables.

The driving situation danger potential $\Delta_{ds}$, on the other hand is estimated on the basis of some parameters describing the driving situation such as the vehicle speed $v_0$ of the vehicle to be braked, the vehicle acceleration $a_0$, the distance $d_0$ towards the vehicle driving ahead, the relative speed $\dot{d}_0$ in relation to the vehicle driving ahead and the relative acceleration $\ddot{d}_0$ in relation to the vehicle driving ahead (see FIG. 2). This listing of the parameters is not concluding but additional parameters may be taken into consideration such as the wheelslip information that can be determined by an intelligent brake system.

Out of the distance $d_0$ and its differentiations in time a theoretical moment of collision $t_c$ can be determined after which both vehicles would collide under constant speed and constant acceleration.

For $\dot{d}_0<0$ and $\ddot{d}_0=0$ the following applies:

$$t_c = -\frac{d_0}{\dot{d}_0}$$

If $\ddot{d}_0 \neq 0$, the following applies:

$$t_c = -\frac{-\dot{d}_0 - \sqrt{\dot{d}_0^2 - 2d_0\ddot{d}_0}}{\ddot{d}_0}$$

No collision occurs if $t_c$ should be negative or complex and $t_c$ is set to infinite. If, however, a collision would occur at constant speed and constant acceleration, the vehicle must be decelerated. At the same time the reaction time $t_R$ shall be taken into consideration.

The reaction time $t_R$ has been statistically exactly determined and on average it amounts to 1.34 s; it consists of the following components:

Recognizing the danger situation and the object, respectively (0.48 s), basic reaction time whilst neuronal processes trigger the corresponding physical reactions (0.45 s), movement time interval for moving the foot from the accelerator to the brake pedal (0.19 s), building up the brake pressure from the moment of touching the brake pedal (0.05 s)

and transmission of the brake pressure to the individual brake elements (0.17 s).

If $t_c<t_R$ applies, an accident can no longer be avoided. If $t_c \geq t_R$ applies, an acceleration $a_{cva}$ is calculated for the vehicle to be braked showing the possible maximum acceleration (or the minimum required deceleration) for the avoidance of the accident. This possible maximum acceleration $a_{cva}$ can be calculated with the following formula:

$$a_{cva} = -\frac{1}{2} \frac{(v_0 + a_{cv0}t_R)^2}{d_0 - v_0 t_R - \frac{1}{2}a_{cv0}t_R^2 - \frac{1}{2}\frac{(v_0 + \dot{d}_0)^2}{a_{cv0} + \ddot{d}_0}}$$

The calculated acceleration is the permitted maximum acceleration after the reaction time $t_R$. The driver, however, can already brake with the actual acceleration $a_{cvo}$ so that no additional deceleration is required. If one would then determine the danger potential solely on the basis of the permitted maximum acceleration, it could result in an unnecessary additional deceleration. It is therefore expedient to use the difference $a_{cve}$ between the permitted maximum acceleration $a_{cva}$ and the actual acceleration $a_{cvo}$ as the basis for determining the danger potential $\Delta$ ($a_{cve}=a_{cva}-a_{cvo}$). This is the additional deceleration the driver has to achieve after the end of the reaction time $t_R$. Since a deceleration higher than 0.9 g as a rule cannot be achieved, $\Delta=1$ is set for $a_{cve}=0.9$ g.

For $a_{cve} \geq 0$ the risk of an accident is low, so that $\Delta=0$ can be set for $a_{cve} \geq 0$. This means that in case of an acceleration of the vehicle of, for example, 0.2 g, $\Delta$ would equal 1 if the necessary deceleration is 0.7 g because then $a_{cve}$ would amount to −0.9 g.

Figure 3:
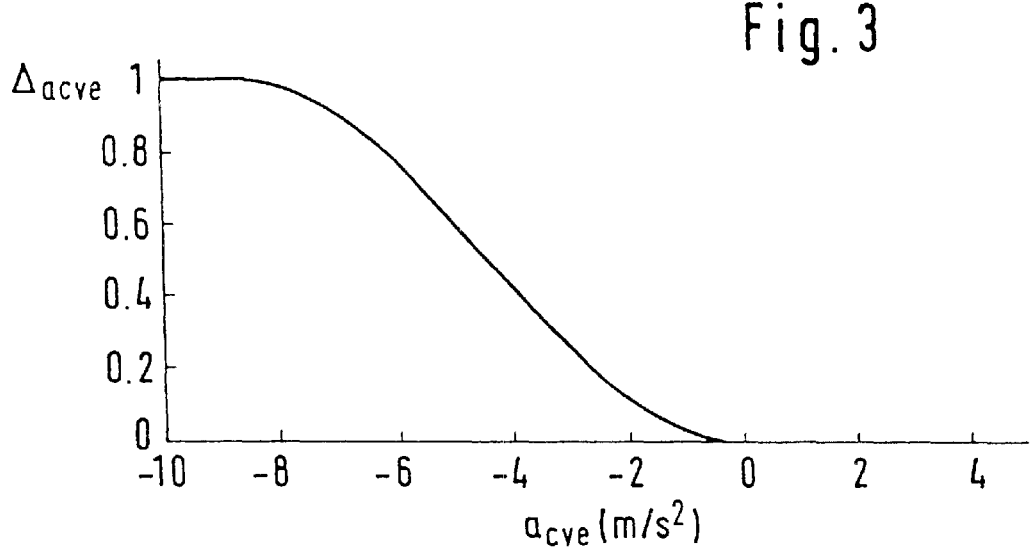
FIG. 3 each of them functions for the calculation of the to 6 driving situation danger potential $\Delta_{ds}$.

Decelerations between 0 to 0.3 g are customary in daily traffic and can be easily achieved. In this range the danger potential $\Delta$ should not deviate strongly from 0. Decelerations in the range of 0.6 g to 0.9 g are more infrequent. Therefore the danger potential $\Delta$ should amount to approximately 1 in this range. In the range of between 0.3 g and 0.6 g $\Delta$ should rise from 0 to 1. A function complying with these requirements is shown in FIG. 3 and provided by the following formula:

$$\Delta_{acve}(a_{cve}) = \frac{1}{2} \cdot \left\{ 1 - \cos\left( \pi \cdot \min\left( -\min\left( \frac{a_{cve}}{0,9 \cdot g}, 0 \right), 1 \right) \right) \right\}$$

Figure 4:
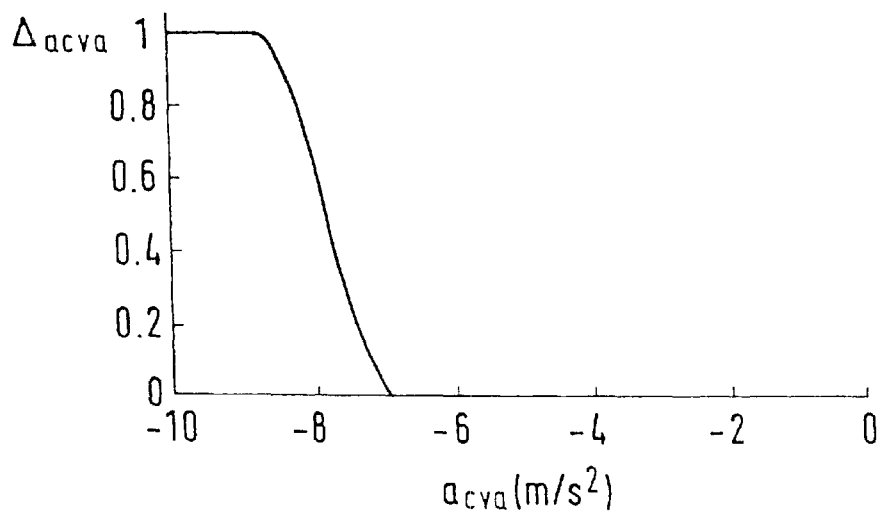
FIG. 4 is a graph of danger potential versus deceleration.
Figure 5:
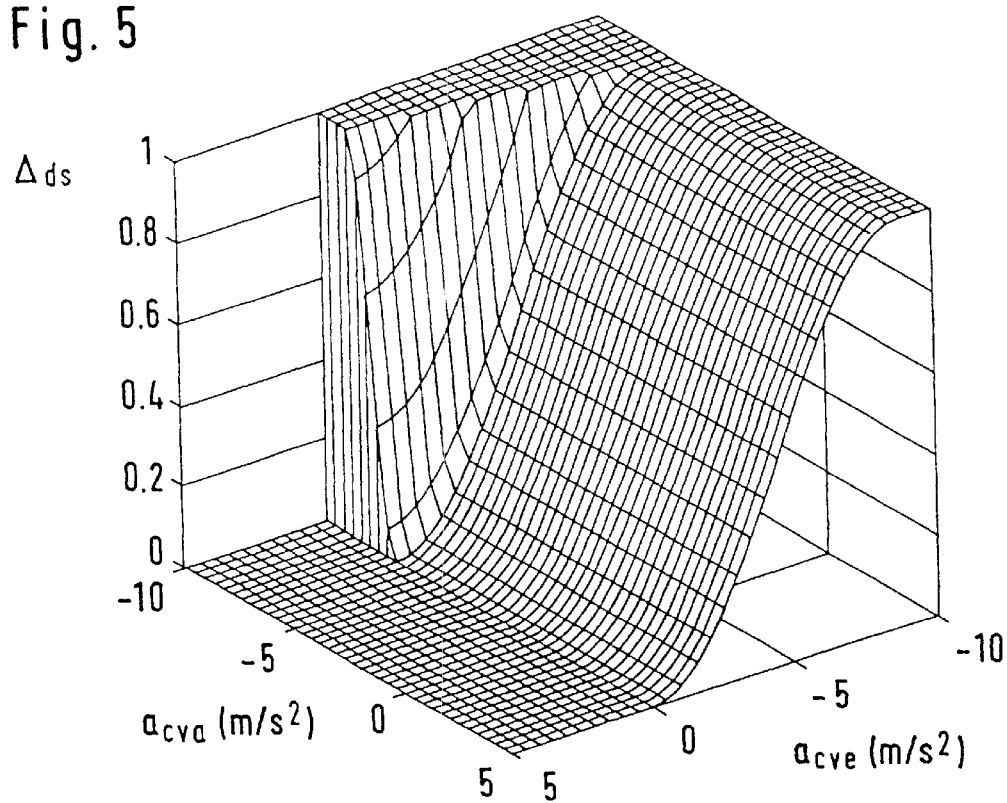
FIGS. 5 and 6 are graphs showing driving situation danger potential as a function of $a_{acve}$ and $a_{acva}$.

For $a_{cva}=-0.9$ g and $a_{cvo}=-0.7$ g $\Delta_{acve}$ states a low danger potential. Since, however, a deceleration of 0.9 g is a very high deceleration being close to the physical limits of the frictional force between the wheels and the road, there is a considerable accident risk. Any minor change in the road conditions or the movement of the vehicle may require a deceleration that is higher than the deceleration physically possible. For this reason the vehicle should be quickly transferred into a driving condition where a lower deceleration is required. Therefore it is expedient that the danger potential $\Delta$ is also directly dependent upon $a_{cva}$. A danger potential $\Delta_{acva}$ (FIG. 4), for example, is set equal to 1 for the range of a possible maximum deceleration $a_m$ and equal to 0 for a deceleration $a_0$ that is 0.2 g lower than $a_m$.

$$\Delta_{acva}(a_{cva}) = \frac{1}{2} \cdot \left\{1 - \cos\left(\pi \cdot \min\left(\left(\frac{a_{cva} - a_0}{a_0 - a_m}\right), 0\right), 1\right)\right\}$$

The entire danger potential $\Delta$ should be at least as high as the maximum of $\Delta_{acva}$ and $\Delta_{acve}$. If $\Delta_{acva}$ and $\Delta_{acve}$ are higher than 0, the actual danger is greater than what the individual values express because they are based on two different sources of danger, since $\Delta_{acva}$ shows a limited adhesion between the road and the wheel for the required acceleration whilst on the other hand $\Delta_{acve}$ states that the necessary deceleration cannot be achieved. Therefore the total from $\Delta_{acve}$ and $\Delta_{acva}$ is preferably used as the driving situation danger potential $\Delta_{ds}$ if $a_{cve}$ is lower than 0:

$$\Delta_{ds} = (a_{cve}, a_{cva}) = \min(1, \Delta_{acve} + \Delta_{acva})$$

In order to avoid a jerky change in the braking torque and in order to round off the transitions at $a_{acve}$ equal to 0 for $a_{cva}$ lower than $a_0$, $\Delta_{ds}$ is defined for $a_{acve} < 0$ and $a_{acva} < a_0$ as follows: with $$\Delta_{ds}(a_{cve}, a_{cva}) = \Delta_e \cdot \Delta_a$$

$$\Delta_e = \frac{1}{2} \cdot \left\{1 - \cos\left(\pi \cdot \min\left(-\min\left(\frac{a_{cve} - (a_0 - a_m)}{a_0 - a_m}, 0\right), 1\right)\right)\right\} \text{ and}$$

$$\Delta_a = \frac{1}{2} \cdot \left\{1 - \cos\left(\pi \cdot \min\left(-\min\left(\frac{a_{cvu} - a_1}{a_1 - a_m}, 0\right), 1\right)\right)\right\}$$

$$a_1 = a_m + \sqrt{(a_0 - a_m)^2 - a_{cve}^2}$$

Figure 6:
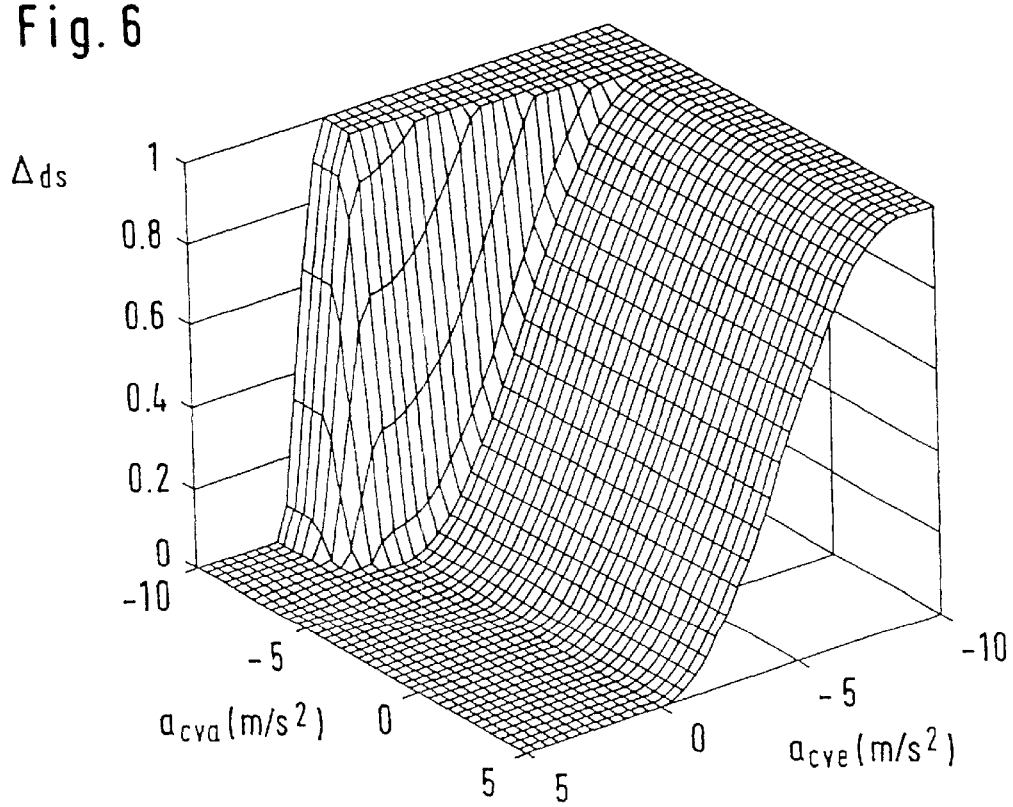

$\Delta_{ds}$ is thus a function of $a_{acve}$ and $a_{acva}$ (FIG. 6) both of them lying in the range from −1 g to 0.5 g.

With the danger potentials $\Delta_{ds}$ and $\Delta_{da}$, respectively, thus obtained the deceleration during a braking action can be adjusted to the actual danger conditions. The braking behavior of the brake, however, should be so adjusted that it is always foreseeable for the driver and he/she has the feeling of having his/her brake under complete control at any time. Therefore the brake pressure should only be increased when the brake pedal is activated. For this reason the brake pressure should not be automatically increased when the brake pedal is standing still even if the danger potential $\Delta$ is equal to 1.

With the help of the block schematic diagram shown in FIG. 7 and the function sequence shown in FIG. 8 a first embodiment example of a static brake adaption in accordance with the invention is explained below that fulfills the aforementioned stipulated targets.

To begin with a driver danger potential $\Delta_{da}$ is calculated in the above manner from the change in the pedal force $F_d$. From the driver danger potential $\Delta_{da}$ a set-point amplification factor $\Lambda_{ref}$ is calculated. If the danger potential $\Delta_{da}$ is lower than a threshold value of, for example, 0.25, the set-point amplification factor $\Lambda_{ref}$ is lower than the standard amplification factor $\Lambda_0$ of the brake servo unit during the mechanical operation of its control bar. In this range below the threshold value the braking action is exclusively carried out by the mechanical operation of the control bar.

If the danger potential exceeds the threshold value, the automatic brake adaption starts as soon as the brake is activated; if at the same time danger potential $\Delta$ increases the set-point amplification factor $\Lambda_{ref}$ is increased proportionately to the danger potential $\Delta$. It is expedient if the adapted set-point amplification factor $\Lambda_{ref}$ corresponds to the standard amplification factor $\Lambda_0$ in the range of the threshold value $\Lambda_{SCH}$, so that in case of a low danger potential there is not too strong a change of the amplification factor $\Lambda$ but an automatic change of the amplification factor $\Lambda$ adapted to the particular danger situation, creating a braking behavior the driver can control well.

Figure 7:
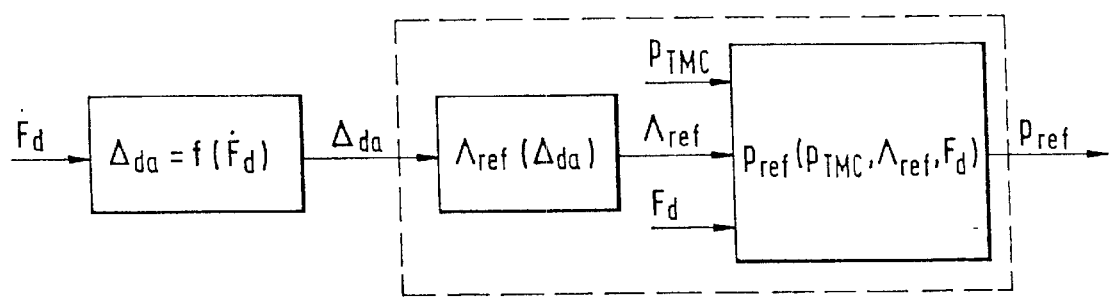
FIG. 7 a first embodiment example of a process in accordance with the invention in a block schematic diagram.
Figure 8:
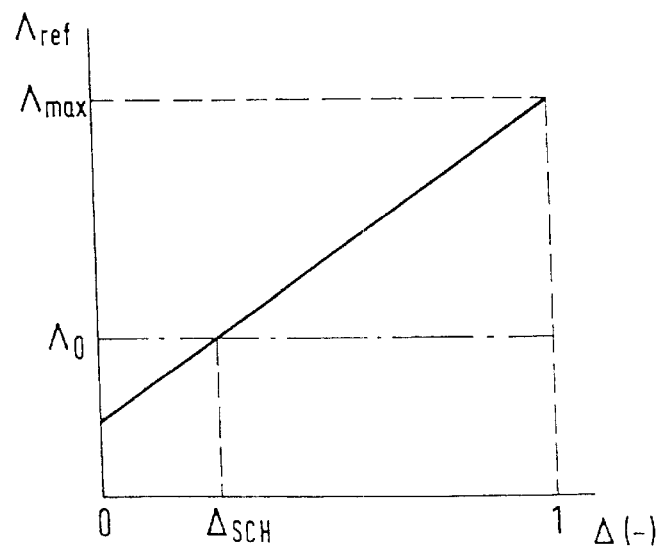
FIG. 8 a function showing the connection between the amplification factor $\Lambda$ and the danger potential $\Delta$.

As shown in FIG. 7 a nominal pressure $P_{ref}$ is determined from the set-point amplification factor $\Lambda_{ref}$, the pedal force $F_{ped}$, and the pressure present in the brake servo unit $P_{TMC}$ to which the pressure of the brake servo unit $P_{TMC}$ is set. Taking the position of the pedal and the corresponding pedal force $F_{ped}$, respectively, into consideration guarantees that the pressure in the brake servo unit is only increased if a corresponding control signal is created at the brake pedal.

Since the braking properties should not change during a braking action, they should at least not be reduced, a set-point amplification factor $\Lambda_{ref}$ once set is not reduced in a preferred development form until the activation of the brake is discontinued, i.e. the foot is taken off the brake pedal.

Figure 9:
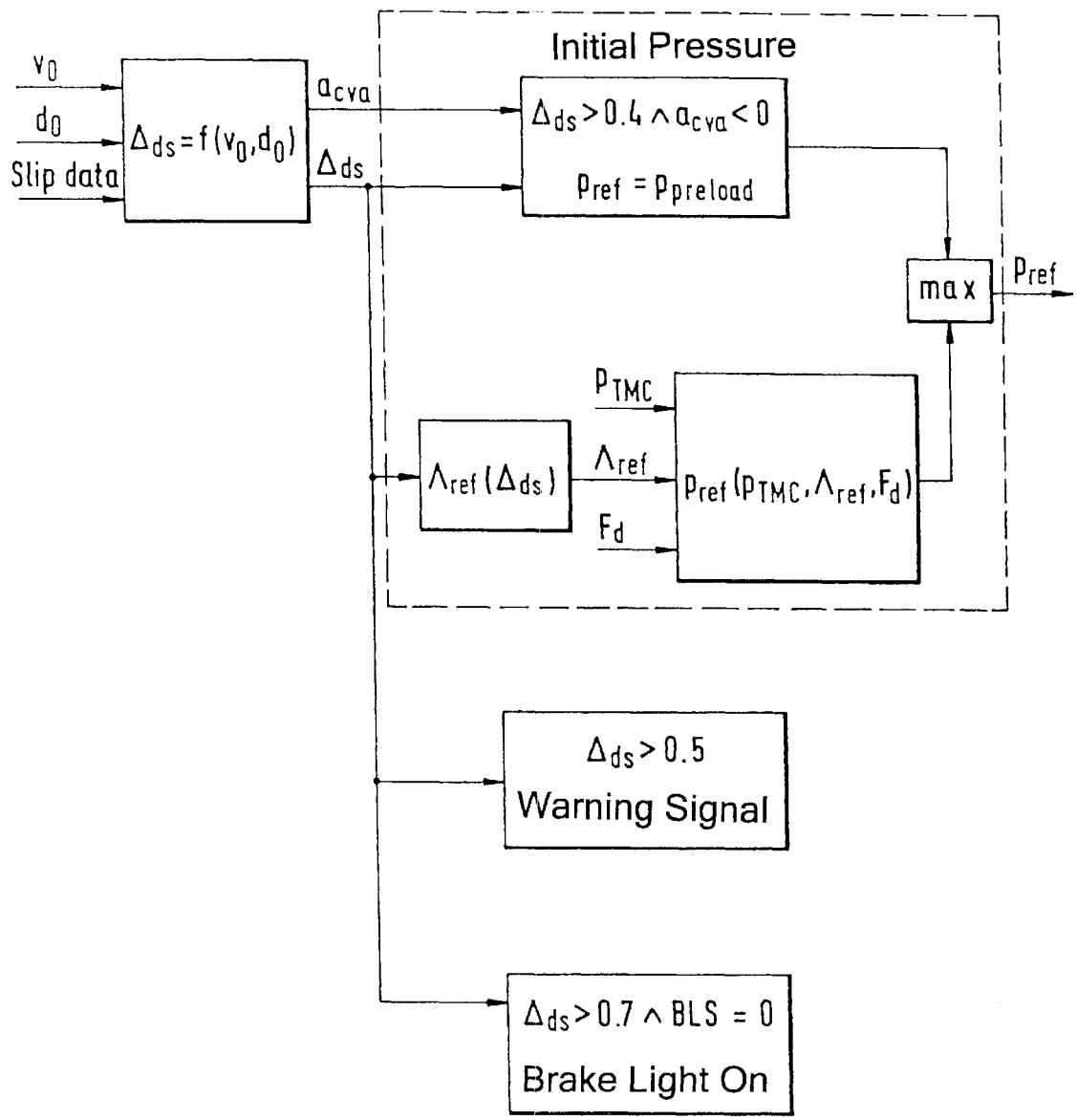
FIG. 9 a modification of the first embodiment example of a process in accordance with the invention in a block schematic diagram.

FIG. 9 shows an additional block schematic diagram of an embodiment example carrying out a static brake adaption. Here the danger potential $\Delta$ is determined according to the driving situation potential $\Delta_{ds}$, described above. If the danger potential is higher than a predetermined inlet pressure threshold value of, for example, 0.4 and the permitted maximum acceleration $a_{cva}$ lower than 0, an inlet pressure function will be activated setting the nominal pressure $P_{ref}$ to a certain inlet pressure $P_{Preload}$ rated so high that a braking pressure is building up in the brake pipes that is just not sufficient to activate the brakes. As a result the pressure in the brake pipes does not have to build up during an activation of the brakes to be expected later and for this reason the brakes will respond faster in such a danger situation.

The nominal pressure $P_{ref}$ is determined in the same way as in the embodiment example described on the basis of FIG. 7; in the case of an active inlet pressure function the higher of the two determined nominal pressures $P_{ref}$ is used as the nominal pressure $P_{ref}$ for triggering the brake servo unit.

If the danger potential $\Delta$ is higher than a previously defined warning signal threshold value that has been set to 0.5 in the present embodiment example, a warning signal is issued in the passenger compartment warning the driver about the danger situation.

If the danger potential $\Delta$ exceeds any traffic warning signal threshold value that is preferably higher than the warning signal threshold value and in the present embodiment example is set to 0.7, the brake lights are switched on to warn the following vehicles. In order to distinguish it from an ordinary braking the brake lights can be switched on blinking or a different warning signal can be issued so that the following traffic is clearly aware of the danger situation and a corresponding safe distance can be maintained.

Thus the determination of the danger potential can be used in combination with the brake adaption, but also independent of it, to warn the driver and/or traffic by creating a preventive measure for the avoidance of accidents.

Figure 10:
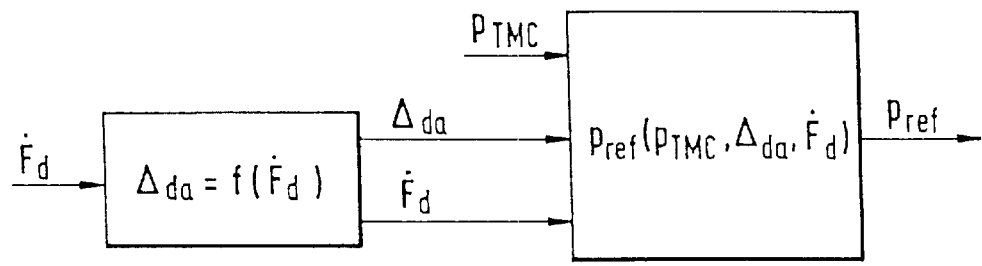
FIG. 10 a second embodiment example of a process in accordance with the invention in a block schematic diagram.

On the basis of FIG. 10 an additional embodiment example of the invention with a dynamic brake adaption is explained.

The determination of the danger potential $\Delta_{ds}$ is carried out in the way described above. However, the set-point amplification factor $\Lambda_{ref}$ is not calculated out of the danger potential, but the nominal pressure $P_{ref}$ is directly calculated in dependence of a change (=1st differentiation in time) of the brake pedal position, the brake pressure or such, so that with the increasing brake pedal pressure the nominal pressure $P_{ref}$ is dynamically increasing. Here it is essential that in order to determine the nominal pressure $P_{ref}$ the first differentiation in time of a physical variable is used that is connected with the activation of the pedal by the driver so that a change in the activation of the pedal results in a dynamic increase or decrease of the brake pressure.

Figure 11:
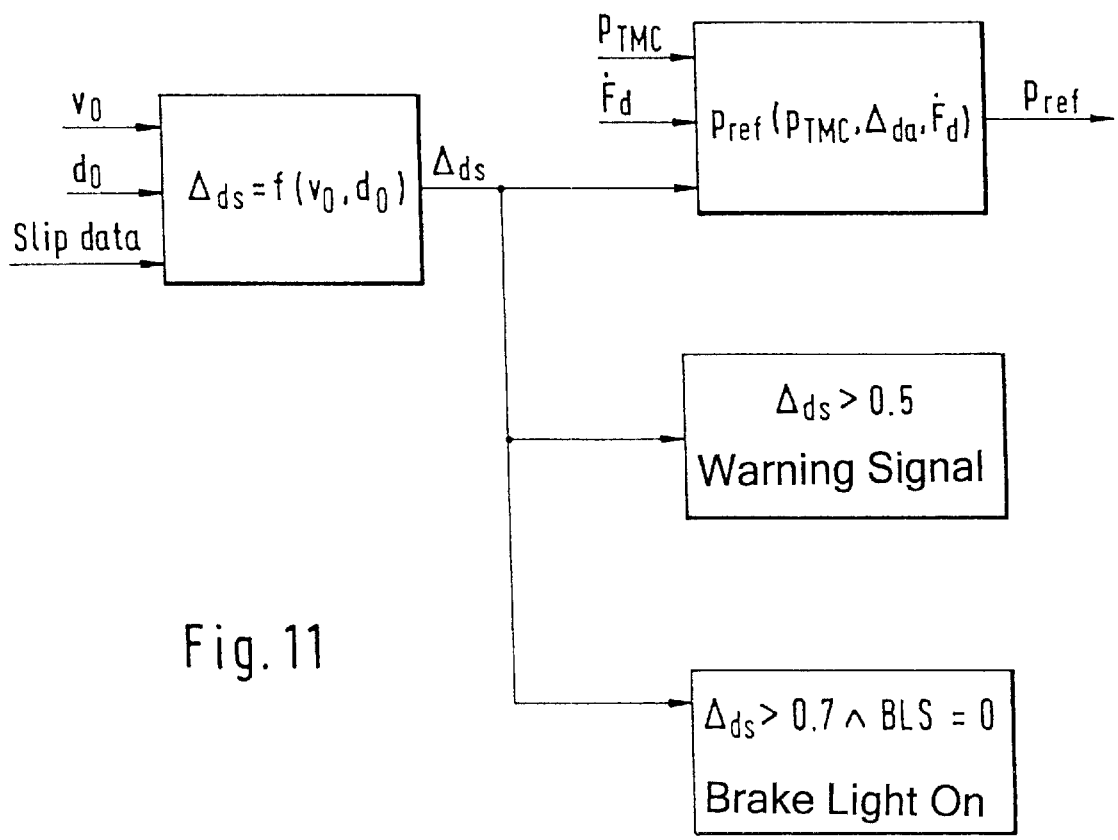
FIG. 11 a modification of the second embodiment example of a process in accordance with the invention in a block schematic diagram.

FIG. 11 shows an additional embodiment example of the invention with a dynamic brake adaption that is equipped with the additional functions described above for issuing a warning signal and switching on the brake lights, respectively.

In case of the embodiment examples described above the danger potential is determined either on the basis of the driver danger potential $\Delta_{da}$ or the driving situation danger potential $\Lambda$. It goes without saying that the danger potential can also be determined on the basis of a combination of the driver danger potential $\Delta_{da}$ and the driving situation danger potential $\Lambda_{ds}$.

The success of the invention is essentially based upon the evaluation of current physical parameters in combination with statistical values drawn from past experience allowing a meaningful estimate of the danger potential. Therefore the invention can be modified by including various statistical results, in particular the evaluation of accident statistics saved in an electronic storage.

Similar to the characteristic diagrams known from the ignition devices these accident statistics are retrieved in dependence of predetermined parameters such as speed, acceleration, activation of the brake pedal, etc.

What is claimed is:

1. Process for shortening the braking distance of a vehicle equipped with a brake servo unit which during a standard braking action is only triggered by the brake pedal pressure caused by the driver and in case of a critical driving situation is so triggered by a control device that in comparison to the standard braking action an increased amplification factor is set at the brake servo unit, comprising the steps of:

determining a danger potential by defining the probability that the vehicle to be braked will be involved in an accident, and increasing the amplification factor in accordance with the danger potential, wherein the amplification factor is only increased by the control device above a certain threshold value of the danger potential, wherein the amplification factor increased by the control device within the range of the threshold value corresponds essentially to the standard amplification factor available during the standard braking action and is continuously increased as the danger potential increases, wherein the danger potential is determined on the basis of one or several parameters influenced by the driver (driver danger potential $\Lambda_{da}$) or one or several parameters induced by a driving situation (driving situation danger potential $\Lambda_{ds}$), wherein the danger potential ($\Lambda_{da}$) is calculated according to the following formula:

$$\Delta = \cos\left(\frac{\dot{F}_{ped}}{\dot{F}_{ped-panic}}\right).$$

2. Process according to claim 1, wherein the danger potential parameters are selected from the set including:

the speed used to remove a foot from the accelerator, the pedal changing time required to change from the accelerator over to the brake pedal, the brake pedal travel, the brake pedal speed, the diaphragm travel ($s_{mem}$) of a diaphragm provided within the brake servo unit or its time differential, the brake pedal force, the change in the brake pedal force and/or the change in the steering angle.

3. Process according to claim 2, wherein a combination of at least two parameters is used to determine the danger potential.

4. Process according to claim 3, wherein at least one of the danger potential parameters is weighted with a weighting factor $g_i$ according to the following formula:

$$\Delta_{da} = \sum_{i=1}^{n} |Parameter_i| \cdot g_i$$

5. Process according to claim 1, wherein the danger potential is calculated according to the following formula:

$$\Delta_{da} = \frac{1}{2} \cdot \left\{1 - \cos\left(\pi \cdot \min\left(\max\left(\frac{\dot{F}_{ped}}{1500}, 0\right), 1\right)\right)\right\},$$

at the same time $\dot{F}_{ped}$ represents the change in the braking force.

6. Process according to claim 1, wherein the danger potential is determined by using at least one of the following parameters:

the vehicle speed ($v_0$), the vehicle acceleration ($a_0$), the distance ($d_0$) to a vehicle driving ahead, the relative speed ($\dot{d}_0$) in relation to a vehicle driving ahead, the relative acceleration ($\ddot{d}_0$) in relation to a vehicle driving ahead or wheelslip information.

7. Process according to claim 6, wherein the danger potential is determined on the basis of a difference from a permitted maximum acceleration and an actual acceleration.

8. Process according to claim 7, wherein the permitted maximum acceleration is calculated according to the following formula:

$$a_{cva} = -\frac{1}{2} \frac{(v_0 + a_{cv0} t_R)^2}{d_0 - v_0 t_R - \frac{1}{2} a_{cv0} t_R^2 - \frac{1}{2} \frac{(v_0 + \dot{d}_0)^2}{a_{cv0} + \ddot{d}_0}},$$

wherein, $t_R$ is the reaction time, $v_0$ the vehicle speed and $d_0, \dot{d}_0, \ddot{d}_0$ the distance to the vehicle driving ahead and its differentiations in time.

9. Process according to claim 7, wherein the danger potential is calculated according to the following formula:

$$\Delta_{acve}(a_{cve}) = \frac{1}{2} \cdot \left\{1 - \cos\left(\pi \cdot \min\left(-\min\left(\frac{a_{cve}}{0, 9 \cdot g}, 0\right), 1\right)\right)\right\}.$$

10. Process according to claim 9, wherein the danger potential is directly dependent upon a permitted maximum speed.

11. Process according to claim 10, wherein the danger potential is calculated according to the following formula:

$$\Delta_{acva}(a_{cva}) = \frac{1}{2} \cdot \left\{ 1 - \cos\left(\pi \cdot \min\left(\left(\frac{a_{cva} - a_0}{a_0 - a_m}\right), 0\right), 1\right)\right\},$$

wherein, $a_{cva}$ is the permitted maximum acceleration, $a_m$ the possible maximum deceleration, and $a_0$ is a declaration that is lower than $a_m$ by at least 0.1 g.

12. Process according to claim 1, wherein the increase of the amplification factor is only carried out when the brake pedal is activated.

13. Process according to claim 12, wherein the amplification factor is carried out proportionally to the brake pedal force or a variable corresponding to it.

14. Process according to claim 12, wherein the increase in the amplification factor is carried out proportionally to the change in the brake pedal force or a variable corresponding to it.

15. Process according to claim 14, wherein an increase in the amplification factor, once taken, is not reduced until the activation of the brake is discontinued.

16. Process according to claim 15, wherein if the danger potential becomes higher than a predetermined inlet pressure threshold value and a permitted maximum speed is lower than 0, then an inlet pressure function is activated which sets a certain inlet pressure in the brake servo unit dimensioned sufficiently high such that a braking pressure is built up in the brake pipes that is insufficient to activate the brakes.

17. Process according to claim 16, wherein when the danger potential is higher than a predetermined warning signal threshold value, a warning signal is issued in the passenger compartment.

18. Process for shortening the braking distance of a vehicle equipped with a brake servo unit which during a standard braking action is only triggered by the brake pedal pressure caused by the driver and in case of a critical driving situation is so triggered by a control device that in comparison to the standard braking action an increased amplification factor is set at the brake servo unit, comprising the steps of:

determining a danger potential by defining the probability that the vehicle to be braked will be involved in an accident, and increasing the amplification factor in accordance with the danger potential, wherein the amplification factor is only increased by the control device above a certain threshold value of the danger potential, wherein the amplification factor increased by the control device within the range of the threshold value corresponds essentially to the standard amplification factor available during the standard braking action and is continuously increased as the danger potential increases, wherein the danger potential is determined on the basis of one or several parameters influenced by the driver (driver danger potential $\Lambda_{da}$) or one or several parameters induced by a driving situation (driving situation danger potential $\Lambda_{ds}$) wherein the danger potential is calculated according to the following formula:

$$\Delta_{da} = \frac{1}{2} \cdot \left\{ 1 - \cos\left(\pi \cdot \min\left(\max\left(\frac{\dot{F}_{ped}}{1500}, 0\right), 1\right)\right)\right\},$$

at the same time $\dot{F}_{ped}$ represents the change in the braking force.

19. Process for shortening the braking distance of a vehicle equipped with a brake servo unit which during a standard braking action is only triggered by the brake pedal pressure caused by the driver and in case of a critical driving situation is so triggered by a control device that in comparison to the standard braking action an increased amplification factor is set at the brake servo unit, comprising the steps of:

determining a danger potential by defining the probability that the vehicle to be braked will be involved in an accident, and increasing the amplification factor in accordance with the danger potential, wherein the amplification factor is only increased by the control device above a certain threshold value of the danger potential, wherein the amplification factor increased by the control device within the range of the threshold value corresponds essentially to the standard amplification factor available during the standard braking action and is continuously increased as the danger potential increases, wherein the danger potential is determined on the basis of one or several parameters influenced by the driver (driver danger potential $\Lambda_{da}$) or one or several parameters induced by a driving situation (driving situation danger potential $\Lambda_{ds}$), wherein the danger potential is determined by using at least one of the following parameters:

the vehicle speed ($v_0$), the vehicle acceleration ($a_0$), the distance ($d_0$) to a vehicle driving ahead, the relative speed ($\dot{d}_0$) in relation to a vehicle driving ahead, the relative acceleration ($\ddot{d}_0$) in relation to a vehicle driving ahead or wheelslip information wherein the danger potential is determined on the basis of a difference from a permitted maximum acceleration and an actual acceleration wherein the permitted maximum acceleration is calculated according to the following formula:

$$a_{cva} = -\frac{1}{2} \frac{(v_0 + a_{cv0} t_R)^2}{d_0 - v_0 t_R - \frac{1}{2} a_{cv0} t_R^2 - \frac{1}{2} \frac{(v_0 + \dot{d}_0)^2}{a_{cv0} + \dot{d}_0}},$$

wherein, $t_R$ is the reaction time, $v_0$ the vehicle speed and $d_0, \dot{d}_0, \ddot{d}_0$ the distance to the vehicle driving ahead and its differentiations in time.

20. Process for shortening the braking distance of a vehicle equipped with a brake servo unit which during a standard braking action is only triggered by the brake pedal pressure caused by the driver and in case of a critical driving situation is so triggered by a control device that in comparison to the standard braking action an increased amplification factor is set at the brake servo unit, comprising the steps of:

determining a danger potential by defining the probability that the vehicle to be braked will be involved in an accident, and increasing the amplification factor in accordance with the danger potential, wherein the amplification factor is only increased by the control device above a certain threshold value of the danger potential, wherein the amplification factor increased by the control device within the range of the threshold value corresponds essentially to the standard amplification factor available during the standard braking action and is continuously increased as the danger potential increases, wherein the danger potential is determined on the basis of
one or several parameters influenced by the driver (driver danger potential $\Lambda_{da}$) or
one or several parameters induced by a driving situation (driving situation danger potential $\Lambda_{ds}$)
wherein the danger potential is determined by using at least one of the following parameters:
the vehicle speed ($v_0$),
the vehicle acceleration ($a_0$),
the distance ($d_0$) to a vehicle driving ahead,
the relative speed ($\dot{d}_0$) in relation to a vehicle driving ahead,
the relative acceleration ($\ddot{d}_0$) in relation to a vehicle driving ahead or wheelslip information
wherein the danger potential is determined on the basis of a difference from a permitted maximum acceleration and an actual acceleration
wherein the danger potential is calculated according to the following formula:

$$\Delta_{acve}(a_{cve}) = \frac{1}{2} \cdot \left\{ 1 - \cos\left( \pi \cdot \min\left( -\min\left( \frac{a_{cve}}{0, 9 \cdot g}, 0 \right), 1 \right) \right) \right\}.$$

* * * * *

UNITED STATES PATENT AND TRADEMARK OFFICE
CERTIFICATE OF CORRECTION

PATENT NO. : 6,473,681 B1
DATED : October 29, 2002
INVENTOR(S) : Alfred Eckert, Thomas Berthold and Erwin Tieleman It is certified that error appears in the above-identified patent and that said Letters Patent is hereby corrected as shown below:

Column 11,
Line 9, change "$a_o$ is a declaration that is" to -- $a_o$ is a deceleration of --.

Signed and Sealed this

Eighteenth Day of March, 2003

JAMES E. ROGAN
*Director of the United States Patent and Trademark Office*